Patented July 7, 1931

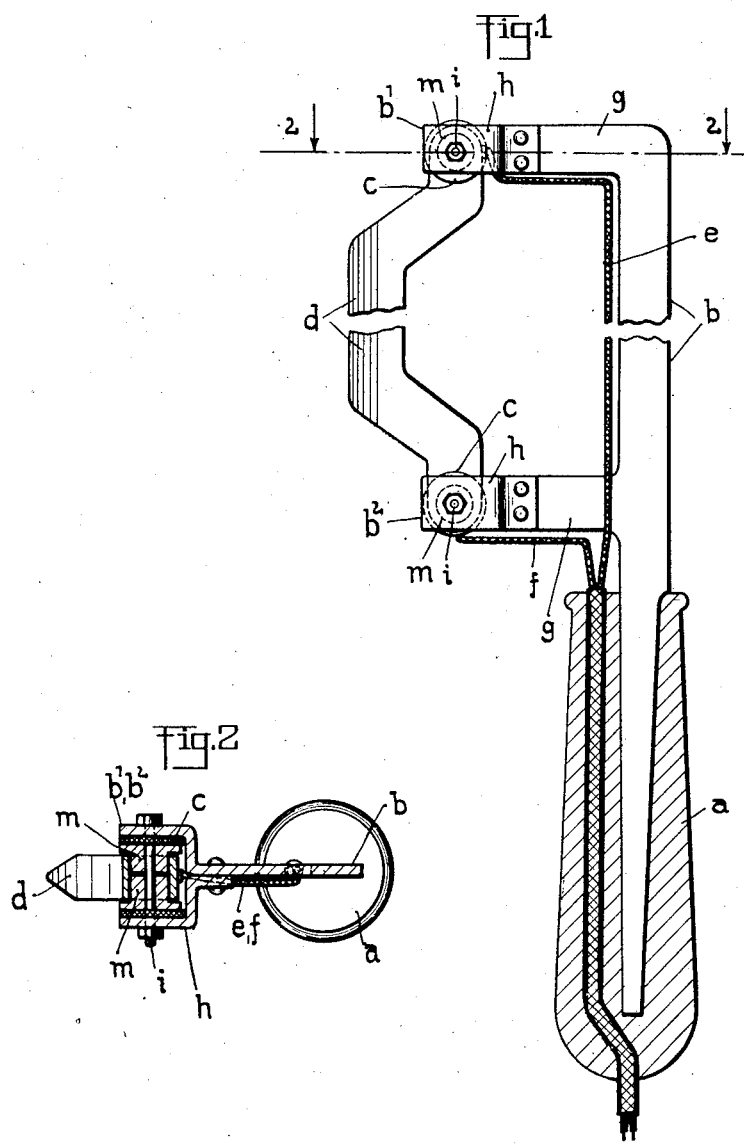

1,813,161

UNITED STATES PATENT OFFICE

CARL HELLE, OF BRUNSWICK, GERMANY, ASSIGNOR TO ELEKTRISCHE LÖT-UND SCHWEISS-GESELLSCHAFT MIT BESCHRANKTER HAFTUNG, OF BRUNSWICK, GERMANY

ELECTRICALLY HEATED SOLDERING IRON

Application filed October 3, 1929, Serial No. 397,044, and in Germany March 19, 1929.

My invention relates to improvements in electrically heated soldering irons, and the object of the improvements is to provide a soldering iron which is not subject to destruction by overheating, and with this object in view my invention consists in constructing the soldering block from a material such for example as chromium-nickel steel having a sufficient resistance to electric current that it can be used as resistance material for transforming the energy of the electric current into heat.

For the purpose of explaining the invention an example embodying the same has been shown in the accompanying drawings in which the same reference characters have been used in all the views to indicate corresponding parts. In said drawings, Fig. 1 is an elevation partly in section showing the soldering iron, and Fig. 2 is a sectional plan view taken on the line 2—2 of Fig. 1.

In the example shown in the drawings the soldering iron comprises a handle $a$ and an arm $b$ embedded in the said handle and having laterally directed shanks $g$ having angular pieces $h$ secured thereto to provide chambers for receiving the soldering block $d$. Preferably, the said soldering block is bent outwardly into V-shape, and it is fixed with its ends within the said housings by means of screws $i$, sheets $c$ of insulating material such as asbestos being preferably interposed between the walls of the housings and the side walls of the block $d$. To the ends of the block $d$ leads $e$ and $f$ are electrically connected, which are preferably passed through a longitudinal bore of the handle $a$.

By constructing the block $d$ of resistance material such as chromium-nickel steel the current passed therethrough is transformed into heat. Even when heating the block $d$ for a long time without using the same the said material is not affected injuriously.

The soldering iron may also be used in soldering machines and the like.

I claim:

The hereindescribed soldering apparatus, comprising a supporting member having a pair of spaced laterally directed shanks for supporting a soldering block, a soldering block of chromium nickel steel supported by and insulated from said shanks, said soldering block being of substantial cross-section and length and having its central portion off-set beyond the ends of said supporting shanks and substantially parallel with said supporting member, and means whereby electric current may be supplied to said block.

In testimony whereof I affix my signature.

CARL HELLE.